(12) United States Patent
Wei

(10) Patent No.: US 11,339,978 B2
(45) Date of Patent: May 24, 2022

(54) AIR CONDITIONER

(71) Applicants: Qingdao Haier Air-conditioning Electronic Co., Ltd, Shandong (CN); Haier Smart Home Co., Ltd., Shandong (CN)

(72) Inventor: Changjian Wei, Qingdao (CN)

(73) Assignees: Qingdao Haier Air-conditioning Electronic Co., Ltd, Qingdao (CN); Haier Smart Home Co., Ltd., Qingdao (CN)

( * ) Notice: Subject to any disclaimer, the term of this patent is extended or adjusted under 35 U.S.C. 154(b) by 0 days.

(21) Appl. No.: 16/962,633

(22) PCT Filed: Sep. 25, 2019

(86) PCT No.: PCT/CN2019/107805
§ 371 (c)(1),
(2) Date: Jul. 16, 2020

(87) PCT Pub. No.: WO2020/181760
PCT Pub. Date: Sep. 17, 2020

(65) Prior Publication Data
US 2021/0215358 A1    Jul. 15, 2021

(30) Foreign Application Priority Data
Mar. 14, 2019 (CN) .......................... 201910195224.5

(51) Int. Cl.
*F24F 1/24* (2011.01)

(52) U.S. Cl.
CPC ..................... *F24F 1/24* (2013.01)

(58) Field of Classification Search
CPC ..................... F24F 1/24; F24F 1/48
See application file for complete search history.

(56) References Cited

FOREIGN PATENT DOCUMENTS

| CN | 105674432 A | * | 6/2016 |
| CN | 108844144 A | * | 11/2018 |

OTHER PUBLICATIONS

CN-105674432-A Translation (Year: 2016).*
CN-108844144-A Translation (Year: 2018).*

* cited by examiner

*Primary Examiner* — Schyler S Sanks
(74) *Attorney, Agent, or Firm* — Maier & Maier, PLLC

(57) ABSTRACT

To solve the problem of low heat dissipation efficiency of existing electrical control modules an air conditioner is provided that includes an outdoor unit, and the outdoor unit has an air outlet and includes an electrical control box; the electrical control box includes an electrical control module configured with a heat dissipation unit; the heat dissipation unit includes a heat dissipation assembly and a flow guide member enclosing the heat dissipation assembly, the flow guide member and the heat dissipation assembly form an air discharge region close to the air outlet, and the flow guide member and the heat dissipation assembly form an air intake region remote from the air outlet; the air discharge region is smaller than the air intake region. As a result, the velocity of air flowing through the heat dissipation assembly is increased and the heat dissipation efficiency is improved.

8 Claims, 11 Drawing Sheets

AIR CONDITIONER

FIELD

The present disclosure relates to the technical field of air conditioners, and particularly provides an air conditioner.

BACKGROUND

An outdoor unit of a multi-connected air conditioner with an air outlet on the top includes a housing and an electrical control box disposed inside the housing, wherein the electrical control box includes a box body and an electrical control module disposed in the box body. During the operation of the air conditioner, the electrical control module will generate a large amount of heat. If the heat is not dissipated in time, it may cause overheating or even short circuit of the electronic control module. Therefore, a corresponding heat dissipation device is required to be provided to take the heat away. At present, this heat is usually dissipated by using heat sinks.

However, since both the heat sinks and the electronic control module are usually disposed in the housing, the heat dissipated by the heat sinks cannot be completely discharged from the housing; namely, dissipating the heat generated by the electronic control module by using the heat sinks can only have a low heat dissipation efficiency. Moreover, the current heat sinks are made of aluminum alloy. The heat sinks have sharp acute-angled edges, which poses a safety hazard.

Accordingly, there is a need for a new technical solution in the art to solve the above problem.

SUMMARY

In order to solve the above-mentioned problem in the related art, that is, to solve the problem of low heat dissipation efficiency of an electrical control module of existing air conditioners, the present disclosure provides an air conditioner, wherein the air conditioner includes an outdoor unit of the air conditioner, and the outdoor unit of the air conditioner has an air outlet and includes an electrical control box; the electrical control box includes an electrical control module, and the electrical control module is configured with a heat dissipation unit; wherein the heat dissipation unit includes a heat dissipation assembly and a flow guide member enclosing the heat dissipation assembly, the flow guide member and the heat dissipation assembly form an air discharge region at a position close to the air outlet, and the flow guide member and the heat dissipation assembly form an air intake region at a position remote from the air outlet, so that at least a part of air flowing through the heat dissipation assembly passes through the air intake region, the air discharge region and the air outlet in sequence before being discharged from the outdoor unit of the air conditioner; and wherein the area of the air discharge region is smaller than the area of the air intake region.

In a preferred technical solution of the air conditioner described above, the flow guide member includes a flow guide portion, and the flow guide portion forms a gathering region on a surface remote from the electrical control module so as to block liquid from entering the electrical control module through the heat dissipation assembly.

In a preferred technical solution of the air conditioner described above, the flow guide portion includes a first portion and a second portion, wherein the first portion and the heat dissipation assembly form the air intake region, the second portion and the heat dissipation assembly form the air discharge region, and the first portion and the second portion form the gathering region on the surface remote from the electrical control module.

In a preferred technical solution of the air conditioner described above, the electrical control box includes a panel on which the electrical control module is disposed, wherein the first portion and the second port are both of a sheet-like structure, and an included angle between the first portion and the panel is larger than an included angle between the second portion and the panel.

In a preferred technical solution of the air conditioner described above, the included angle between the first portion and the panel is larger than or equal to 55° and smaller than or equal to 70°.

In a preferred technical solution of the air conditioner described above, the included angle between the second portion and the panel is larger than or equal to 50° and smaller than or equal to 65°, and/or the included angle between the first portion and the panel is 3° to 8° larger than the included angle between the second portion and the panel.

In a preferred technical solution of the air conditioner described above, the gathering region has a first gap with the heat dissipation assembly at a position closest to the heat dissipation assembly, wherein the range of the first gap is 5-20 mm.

In a preferred technical solution of the air conditioner described above, the flow guide member includes a base, the first portion and the second portion are disposed on the base through integral molding or fixed connection, and the base is connected to the panel.

In a preferred technical solution of the air conditioner described above, the base is of a plate-like structure, and there is a second gap between the base and the heat dissipation assembly on a corresponding side, wherein the range of the second gap is 3-5 mm.

In a preferred technical solution of the air conditioner described above, there is a distance difference between a distance from an outer edge of the first portion in an air-discharging direction to an outer edge of the heat dissipation assembly in the air-discharging direction, and a distance from an outer edge of the second portion in the air-discharging direction to the outer edge of the heat dissipation assembly in the air-discharging direction.

It can be understood by those skilled in the art that in the technical solutions of the present disclosure, the electrical control box of the outdoor unit of the air conditioner includes the electrical control module which is configured with the heat dissipation unit, and the heat dissipation unit includes the heat dissipation assembly for taking away the heat generated by the electronic control module; moreover, the flow guide member encloses the outer side of heat dissipation assembly. The flow guide member and the heat dissipation assembly form the air discharge region at a position close to the air outlet, and form the air intake region at a position remote from the air outlet. At least a part of the air in the outdoor unit of the air conditioner will pass through the heat dissipation assembly when it is discharged from the outdoor unit of the air conditioner. With the above arrangement, at least a part of the air flowing through the heat dissipation assembly will pass through the air intake region, the air discharge region and the air outlet in sequence before being discharged from the outdoor unit of the air conditioner.

Moreover, the area of the air discharge region formed as described above is smaller than the area of the air intake region. In a case of the same volume of air flowing through the heat dissipation assembly, the flow velocity of the air in the air discharge region is larger than that of the air in the air intake region; namely, with the above arrangement, the flow velocity of the air flowing through the heat dissipation assembly is increased, thereby enabling more heat of the heat dissipation assembly to be taken away, improving the heat dissipation efficiency of the heat dissipation assembly, and taking away the heat generated by the electronic control module in a better way.

In a preferred technical solution of the present disclosure, the flow guide member includes a flow guide portion including the first portion and the second portion each provided in a sheet-like structure, and the electrical control module is disposed on the panel of the electrical control box, wherein an included angle between the first portion and the panel is larger than an included angle between the second portion and the panel. In this way, the first portion and the heat dissipation assembly form the air intake region with a larger area, and the second portion and the heat dissipation assembly form the air discharge region with a smaller area so that the velocity of the air in the outdoor unit of the air conditioner becomes fast from being slow when passing through the heat dissipation assembly, which improves the ability of this part of air of taking away the heat of the heat dissipation assembly, that is, the heat dissipation efficiency is improved.

Moreover, the first portion and the second portion form the gathering region on a surface remote from the electrical control module so as to block liquid entering the outdoor unit of the air conditioner from the air outlet from entering the electrical control module through the heat dissipation assembly. For example, under rainy and snowy weather conditions, the rainwater entering the outdoor unit of the air conditioner from the air outlet is thrown to the gathering region under the centrifugal action of impellers of a high-speed rotating fan disposed at the air outlet, so that the rainwater is prevented from splashing to the heat dissipation assembly.

In addition, the included angle between the first portion and the panel is 3° to 8° larger than the included angle between the second portion and the panel, the included angle between the first portion and the panel is in a range of 55° to 70°, the included angle between the second portion and the panel is in a range of 50° to 65°, and the gathering region has a first gap with the heat dissipation assembly at a position closest to the heat dissipation assembly, which is in a range of 5-20 mm. With these arrangements, it is possible to ensure that a sufficient amount of air flows through the heat dissipation assembly to take away the heat generated by the electronic control module.

BRIEF DESCRIPTION OF THE DRAWINGS

A multi-connected air conditioner of the present disclosure will be described below with reference to the accompanying drawings, in which.

DETAILED DESCRIPTION

Figure 1:
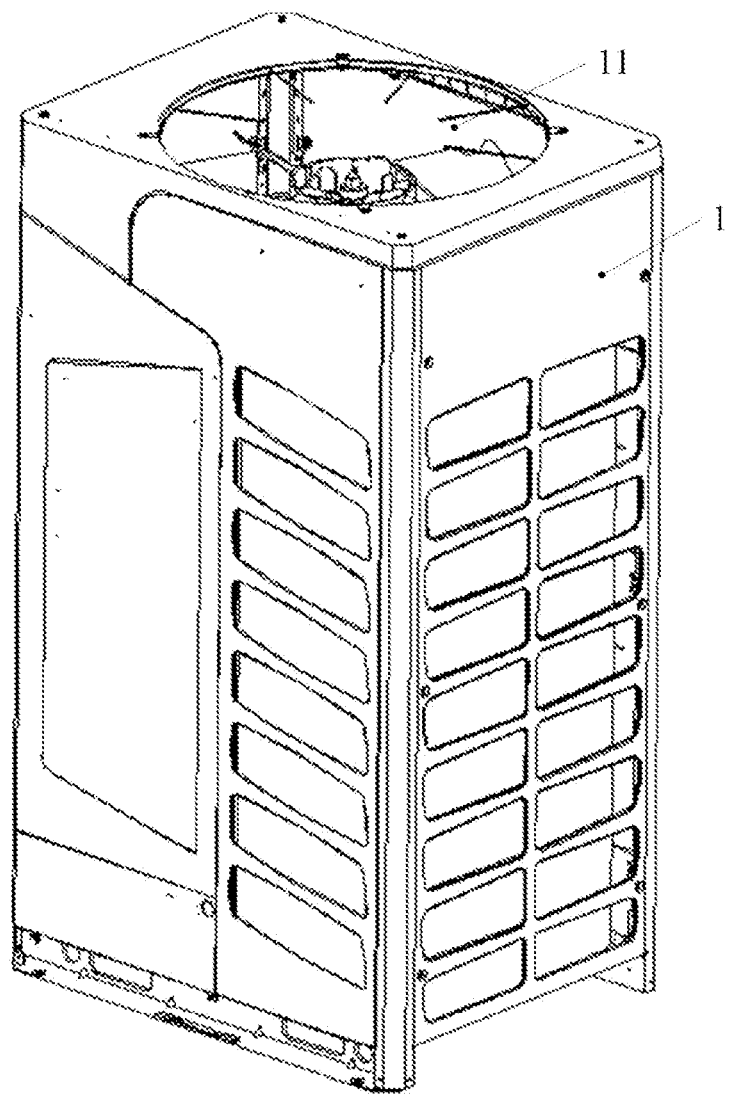
FIG. 1 is a schematic structural view of an outdoor unit of a multi-connected air conditioner with an air outlet on the top according to an embodiment of the present disclosure.

Hereinafter, preferred embodiments of the present disclosure will be described with reference to the accompanying drawings. Those skilled in the art should understand that these embodiments are only used to explain the technical principles of the present disclosure, and are not intended to limit the scope of protection of the present disclosure. For example, although the embodiments are described by taking an outdoor unit of a multi-connected air conditioner with an air outlet on the top as an example, other types of outdoor units of air conditions such as an outdoor unit of a wall-mounted air conditioner and an outdoor unit of a ceiling-mounted air conditioner may also be applied.

It should be noted that in the description of the present disclosure, directional or positional relationships indicated by terms such as "center", "upper", "lower", "left", "right", "vertical", "horizontal", "inner" and "outer" are based on the directions or positional relationships shown in the drawings. They are merely used for the convenience of description, and do not indicate or imply that the device or element involved must have a specific orientation, or be configured or operated in a specific orientation, and therefore they should not be construed as limiting the present disclosure. In addition, terms "first" and "second" are only used for descriptive purposes, and should not be understood as indicating or implying relative importance.

Figure 2:
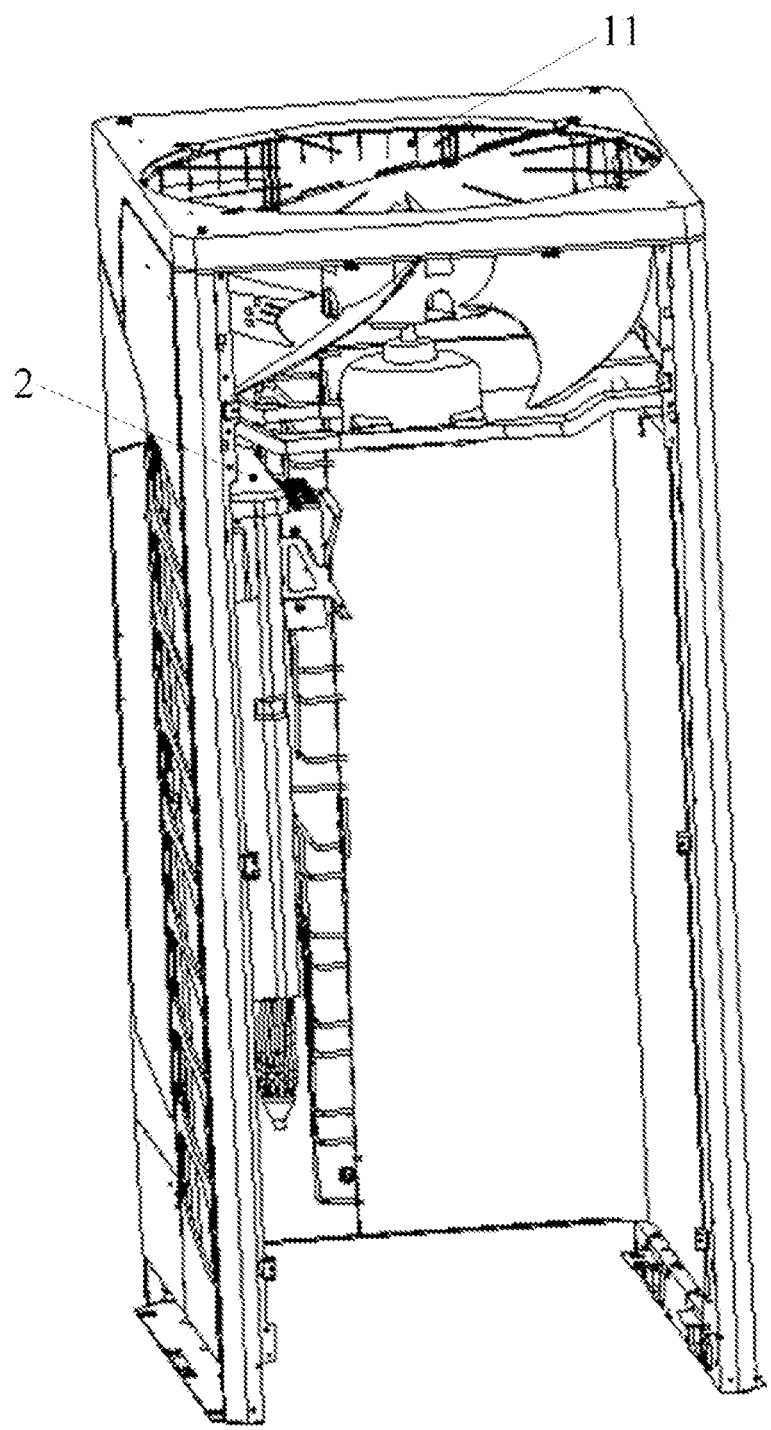
FIG. 2 is a schematic cross-sectional structural view of an outdoor unit of a multi-connected air conditioner with an air outlet on the top according to an embodiment of the present disclosure.
Figure 3:
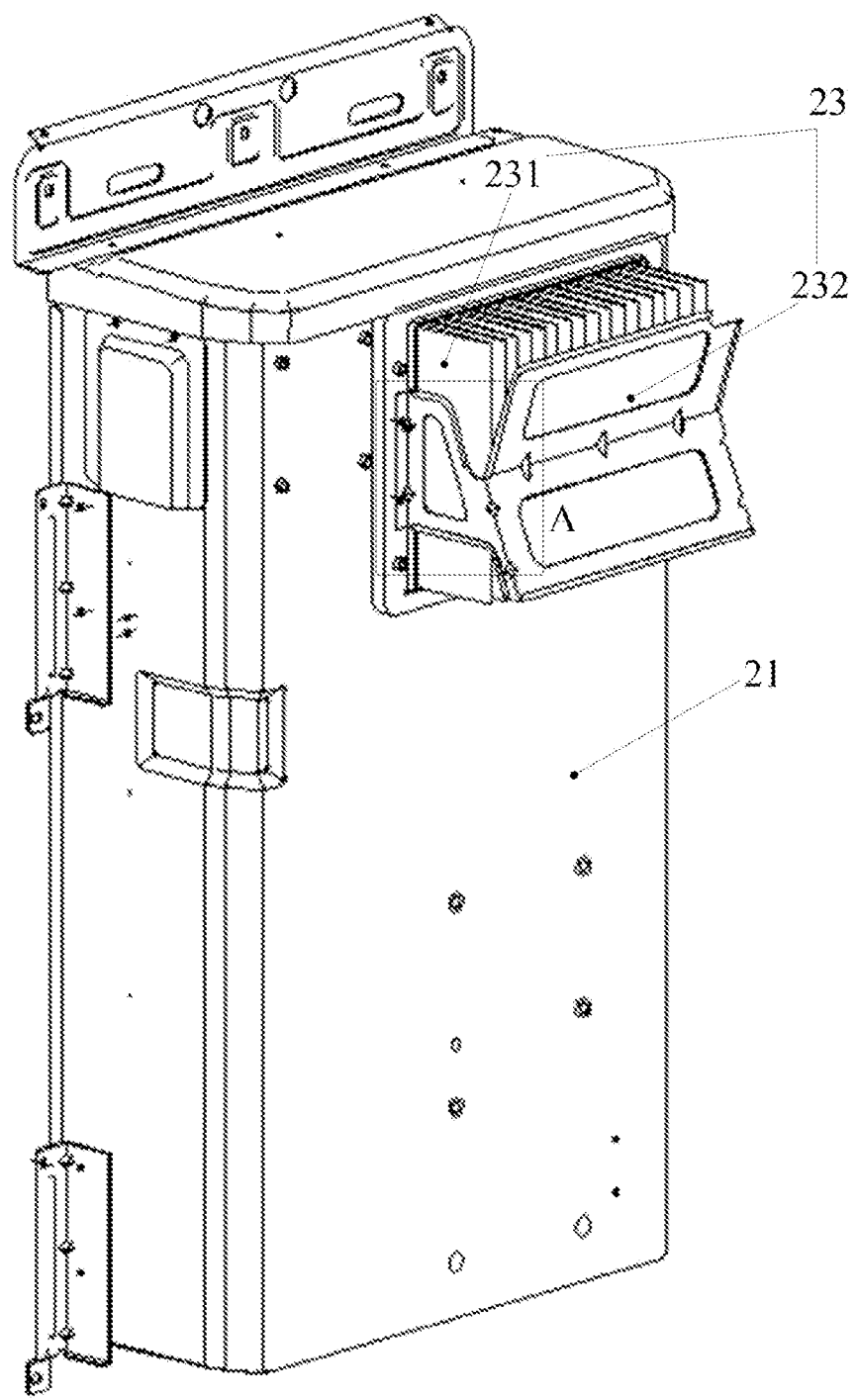
FIG. 3 is a first schematic structural view of an electrical control box of a multi-connected air conditioner according to an embodiment of the present disclosure.
Figure 5:
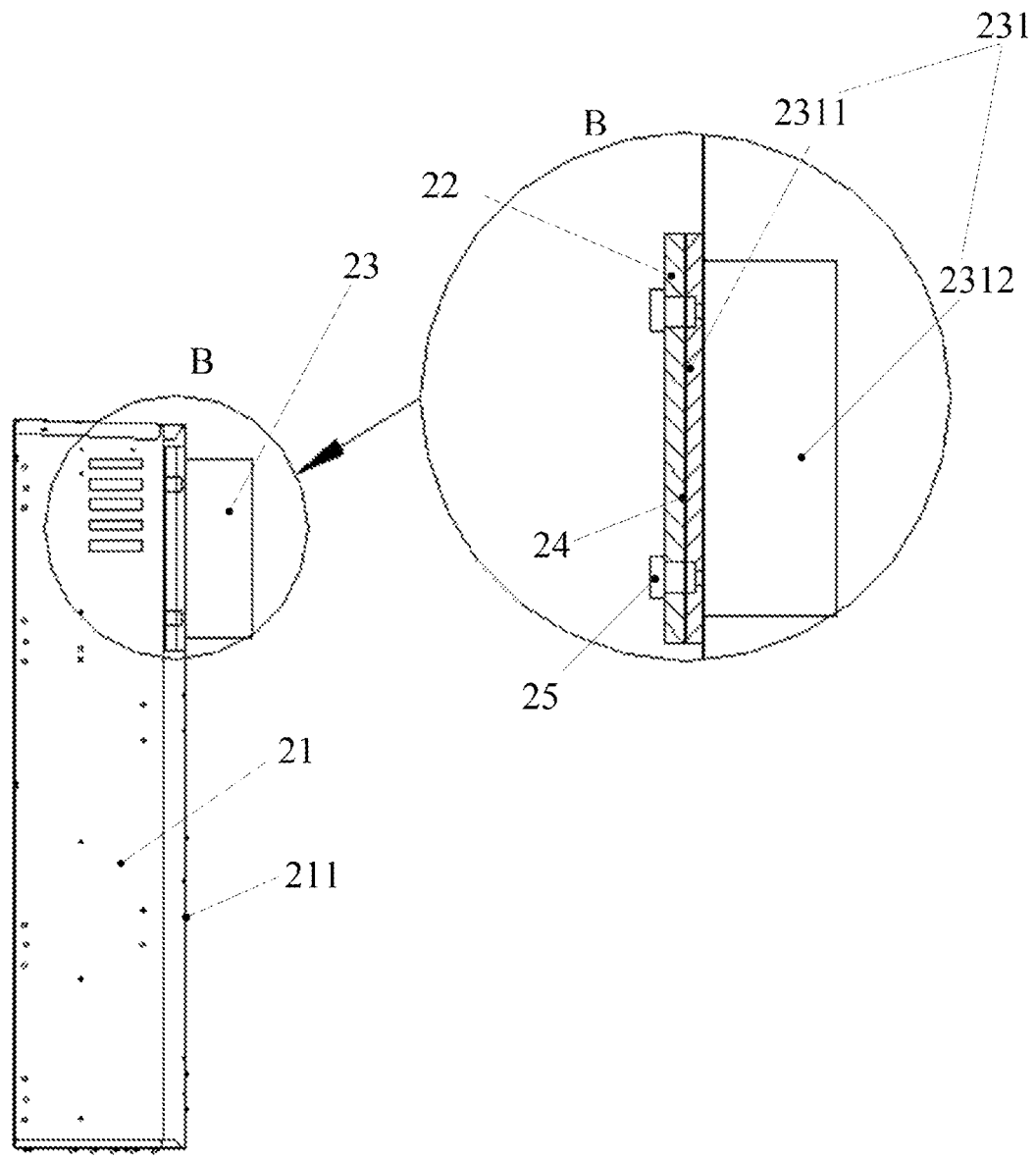
FIG. 5 is a second schematic structural view of an electrical control box of a multi-connected air conditioner according to an embodiment of the present disclosure.

Reference is made to FIG. 1, FIG. 2, FIG. 3, and FIG. 5, wherein FIG. 1 is a schematic structural view of an outdoor unit of a multi-connected air conditioner with an air outlet on the top according to an embodiment of the present disclosure, FIG. 2 is a schematic cross-sectional structural view of an outdoor unit of a multi-connected air conditioner with an air outlet on the top according to an embodiment of the present disclosure, FIG. 3 is a first schematic structural view of an electrical control box of a multi-connected air conditioner according to an embodiment of the present disclosure, and FIG. 5 is a second schematic structural view of an electrical control box of a multi-connected air conditioner according to an embodiment of the present disclosure. As shown in FIG. 1, FIG. 2, FIG. 3 and FIG. 5 and according to the orientation shown in FIG. 1, the outdoor unit of the air conditioner includes a housing 1 and an electrical control box disposed on an inner wall of the housing; an air outlet 11 of the outdoor unit is provided above the housing 1, and the housing 1 is further provided with an air inlet; a fan is provided at the air outlet 11 so that the outdoor unit of the air conditioner can realize ventilation through the air inlet and the air outlet 11 (air enters the outdoor unit of the air conditioner from the air inlet and is discharged from the outdoor unit of the air conditioner through the air outlet). The electrical control box 2 is located below the air outlet 11 (the fan). In this way, at least a part of the air flowing out of the outdoor unit of the air conditioner passes through the electrical control box before being discharged from the outdoor unit of the air conditioner through the air outlet. The electrical control box 2 includes a box body 21 and an electrical control module 22 disposed in the box body. The electrical control module 22 is provided with a heat dissipation unit 23 so as to take away the heat generated by the electrical control module.

The heat dissipating unit 23 of the present disclosure includes a heat dissipation assembly 231 and a flow guide member 232 enclosing the heat dissipation assembly. Generally, in order to achieve a good heat dissipating effect, the heat dissipating unit 23 is usually at least partially located outside the box body 21 of the electrical control box so that at least a part of the air flowing through the electrical control box 2 flows through the heat dissipation assembly 231 before being discharged from the outdoor unit of the air conditioner via the air outlet 11. Further, the flow guide member 232 and the heat dissipation assembly 231 form an air discharge region above the heat dissipation assembly 231, and an air intake region below the heat dissipation assembly 231. In this way, at least a part of the air flowing through the heat dissipation assembly 231 passes through the air intake region, the air discharge region and the air outlet 11 in sequence from the bottom to the top, and is then discharged from the outdoor unit of the air conditioner. In addition, the area of the air discharge region is smaller than the area of the air intake region. In a case of the same volume of air flowing through the heat dissipation assembly, the flow velocity of the air in the air discharge region is larger than that of the air in the air intake region. That is, the wind speed of the air passing through the heat dissipation assembly is gradually increased so that the heat of the heat dissipation assembly can be taken away more effectively, and the heat dissipation efficiency of the heat dissipation assembly is improved.

It can be understood that the air outlet of the outdoor unit of the air conditioner may also be provided at other positions of the housing, such as on a front panel. Those skilled in the art can select a proper arrangement orientation of the air outlet according to the specific type of the air conditioner so as to adapt to a more specific application. Of course, the position where the electrical control box is disposed may also be flexibly selected according to the arrangement of various components in the outdoor unit of the air conditioner.

Figure 4:
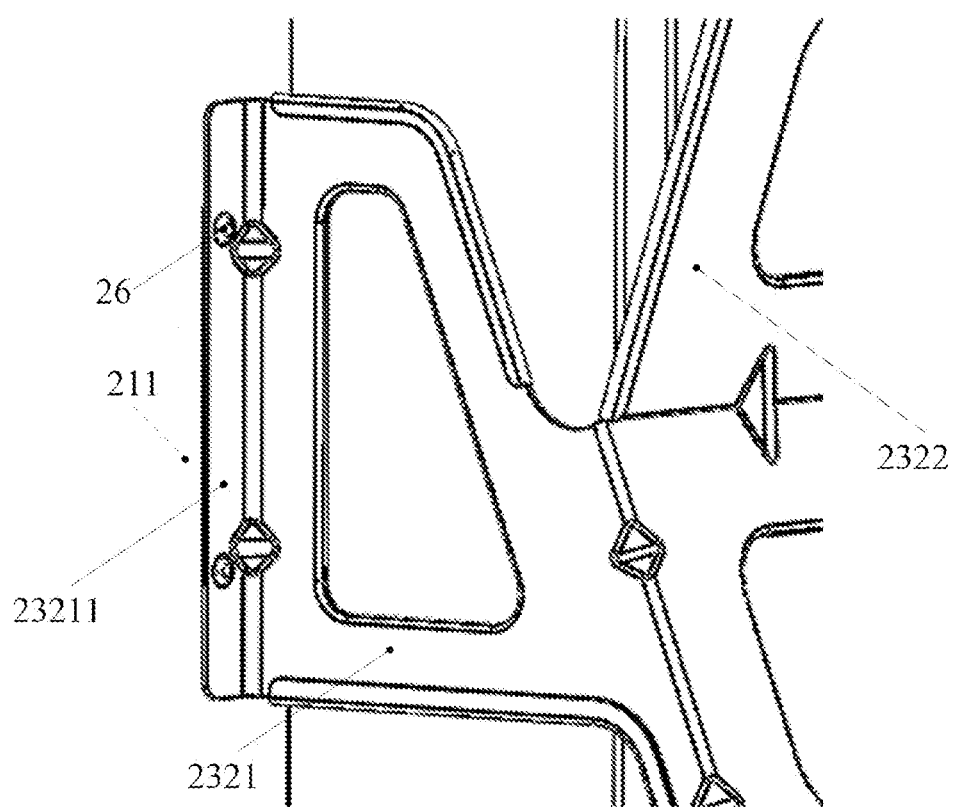
FIG. 4 is an enlarged schematic view of part A in FIG. 3.
Figure 6:
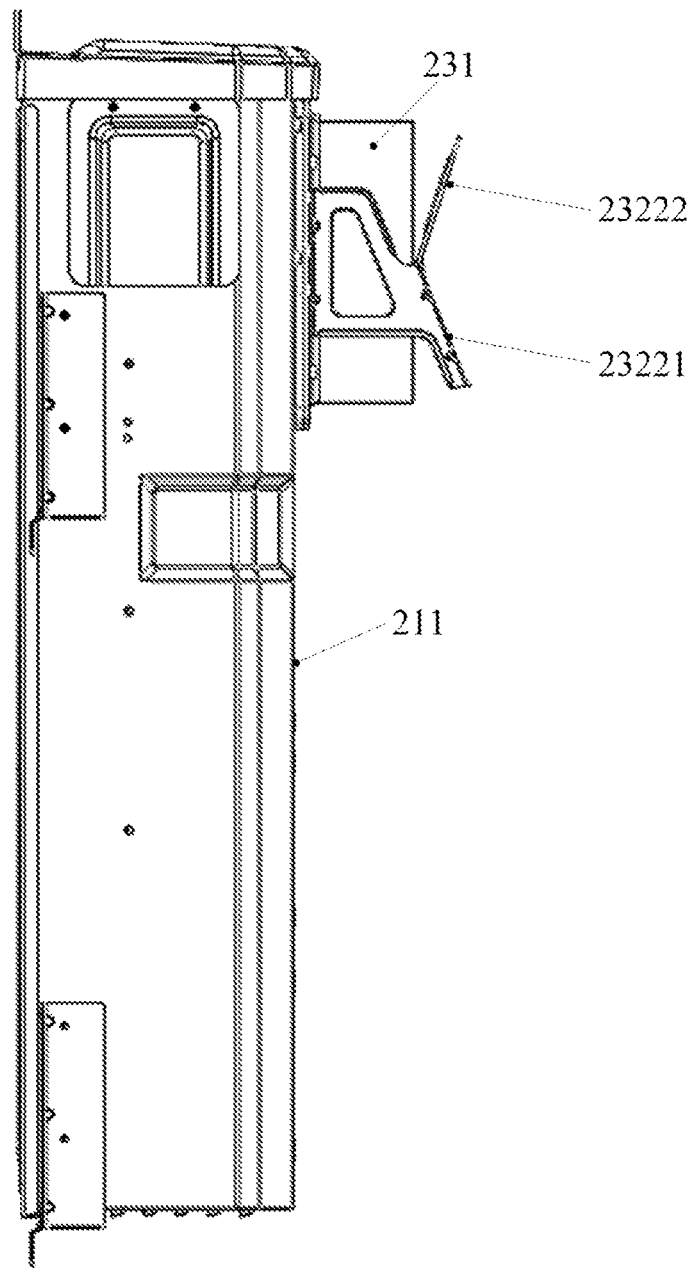
FIG. 6 is a third schematic structural view of an electrical control box of a multi-connected air conditioner according to an embodiment of the present disclosure.

Reference is made to FIG. 3, FIG. 4, FIG. 5 and FIG. 6, wherein FIG. 4 is an enlarged schematic view of part A in FIG. 3, and FIG. 6 is a third schematic structural view of an electrical control box of a multi-connected air conditioner according to an embodiment of the present disclosure. As shown in FIG. 3, FIG. 4, FIG. 5 and FIG. 6 and according to the orientation shown in FIG. 3, the box body 21 includes a panel 211, the electrical control module is disposed on an inner side of the panel 211, and the heat dissipation assembly includes a bottom plate 2311 and a plurality of heat sinks 2312 arranged side by side and perpendicular to the bottom plate so that the heat generated by the electrical control module is dissipated by the heat sinks.

It can be seen that the flow guide member 232 includes a base 2321 and a flow guide portion 2322, wherein the base 2321 includes two mounting pieces each provided in a plate-like structure on both sides of the heat dissipation assembly, and the flow guide portion 2322 includes a first portion 23221 and a second portion 23222 above the first portion. One end of each of the two mounting pieces is fixedly installed on the panel 211, and the other ends are connected to both sides of the first portion 23221 respectively, so that the flow guide member encloses the outer side of the heat dissipation assembly. Taking the flow guide member on the left side as an example, the mounting piece is provided with a bend 23211 at an end close to the panel 211, and the bend 23211 is perpendicular to the mounting piece; screw holes are formed in the bend 23211, and the panel 211 is formed with screw holes at corresponding positions so that second screws 26 can fixedly dispose the flow guide member on the panel.

Alternatively, the two mounting pieces may be connected to both sides of the second portion, or the two mounting pieces may be connected to both sides of each of the first portion and the second portion, or the base may be connected to the first portion and the first portion at other positions, as long as the flow guide portion is fixed on the panel by being connected to the base. Those skilled in the art may select a suitable way of connecting the flow guide member according to the specific application scenario so as to adapt to a more specific application.

Exemplarily, the first portion 23221 and the second portion 23222 are each provided in a sheet-like structure, and a gathering region formed by outer surfaces of the first portion 23221 and the second portion 23222 is formed on the right side remote from the electrical control module so as to block the liquid entering the outdoor unit of the air conditioner from the air outlet from entering the electrical control module through the heat dissipation assembly. According to the orientation shown in FIG. 6, the rainwater entering the outdoor unit of the air conditioner from the air outlet on the top partially flows to the gathering region under the action of the fan. Specifically, the second portion 23222 blocks the rainwater flowing to the upper part of the heat dissipation assembly 231, and the first portion 23221 blocks the rainwater flowing to the lower part of the heat dissipation assembly 231; the rainwater blocked by the first portion and the second portion is collected in the rightmost gathering region, and then flows under the outdoor unit of the air conditioner without flowing to the heat dissipation assembly. Thus, under the cooperative action of the first portion and the second portion, the rainwater is prevented from entering the electrical control module through the heat dissipation assembly, which improves the waterproof performance of the electrical control box.

It can be understood that the first portion and the second portion may also be provided in other structures, for example a curved-surface structure, such as bending at the uppermost and lowermost ends in a direction approaching the electrical control module. Those skilled in the art may determine the specific arrangement of the first portion and the second portion according to the specific arrangement orientation of the electrical control box relative to the air outlet, as long as the rainwater can be prevented from entering the electrical control module through the heat dissipation assembly.

As can be seen, reinforcing ribs are provided between the first portion and the second portion, as well as between the base and a folded edge to enhance the strength of the flow guide member.

In a possible embodiment, the first portion and the second portion are integrally formed, the first portion and the base are integrally formed, and the base is fixedly connected to the panel, that is, the flow guide member is fixedly disposed on the panel through the base. Alternatively, the first portion and the second portion may also be fixedly connected, and the first portion and/or the second portion may also be fixedly connected to the base. Those skilled in the art may select a suitable way of connecting the first portion, the second portion, and the base according to the specific situation of use, so as to adapt to a more specific application.

With continued reference to FIG. 3 and FIG. 6 and according to the orientation shown in FIG. 6, the included angle between the first portion 23221 and the panel 211 is larger than the included angle between the second portion 23222 and the panel 211, whereas a rightmost end surface of the heat dissipation assembly 231 is parallel to the panel, and the included angle between the first portion 23221 and the panel 211 is also the included angle between the first portion 23221 and the rightmost end surface of the heat dissipation assembly 231. In this way, the first portion and the heat dissipation assembly form an air intake region with a larger area, and the second portion and the heat dissipation assembly form an air discharge region with a smaller area. The air flowing through the heat dissipation assembly flows from the larger-area air intake region into the smaller-area air discharge region, whereas the volume of air flowing through the heat dissipation assembly is constant, so the flow velocity of the air is gradually increased, thus enabling the heat of the heat dissipation assembly to be taken away more quickly and improving the heat exchange efficiency.

In a possible embodiment, the included angle between the first portion 23221 and the panel 211 is larger than or equal to 55° and smaller than or equal to 70°, that is, the included angle on the air inlet side is larger than or equal to 55° and smaller than or equal to 70°. It can be known that the included angle on the air inlet side should not be too large or too small, since for the electrical control box of the same specification, the spacing between the base and the heat dissipation assembly is constant, that is, the passage that allows air to pass through is constant. Then, if the included angle is too large, the wind resistance on the air inlet side will be too large. When the wind pressure is constant, the volume of air flowing from the air inlet side to the air outlet side will be reduced, that is, the volume of air passing through the heat dissipation assembly will be reduced. As a result, within the same time period, the heat that can be taken away by the air flowing through the heat dissipation assembly is reduced, which reduces the heat dissipation efficiency. If the included angle is too small, the area of the air intake region is reduced, and when the wind pressure is constant, the volume of air flowing into the air inlet side will be less, that is, the volume of air flowing through the heat dissipation assembly is reduced, and the heat dissipation efficiency is reduced as described above.

In a possible embodiment, the included angle between the second portion 23222 and the panel 211 is larger than or equal to 50° and smaller than or equal to 65°. It can be known that the included angle on the air outlet side should not be too large or too small. If the included angle on the air outlet side is too small, the wind resistance on the air outlet side will be too large. When the wind pressure is constant, the volume of air coming from the air outlet is reduced, so the volume of air entering from the air inlet side is reduced, that is, the volume of air flowing through the heat dissipation assembly is reduced, and the heat dissipation efficiency is reduced as described above. If the included angle on the air outlet side is too large, the included angle between the second portion and the horizontal direction will be too small, that is, the size of the second portion in the vertical direction is reduced, making the second portion not able to well block the rainwater entering the outdoor unit of the air conditioner from the air outlet.

In a possible embodiment, the included angle between the first portion 23221 and the panel 211 is 3°-8° larger than the included angle between the second portion 23222 and the panel 211. It can be known that the difference between the two included angles should not be too large or too small. If the difference is too large, the wind resistance on the air inlet side or the air outlet side will be too large. When the wind pressure is constant, the volume of air flowing through the heat dissipation assembly is reduced, so that within the same time period, the heat that can be taken away by the air flowing through heat dissipation assembly will be reduced, which reduces the heat dissipation efficiency. If the difference is too small, the area of the air intake region does not differ much from the area of the air discharge region, so the velocity of the air flowing from the air intake region to the air discharge region does not change much, that is, the velocity of the air flowing through the heat dissipation assembly does not change much. In this way, when the volume of the air flowing through the heat dissipation assembly is constant, the heat dissipation effect of the heat sinks is limited. Preferably, the included angle between the first portion and the panel is 5° larger than the included angle between the second portion and the panel. If so, the heat dissipation effect of the heat dissipation assembly is the best.

Figure 7:
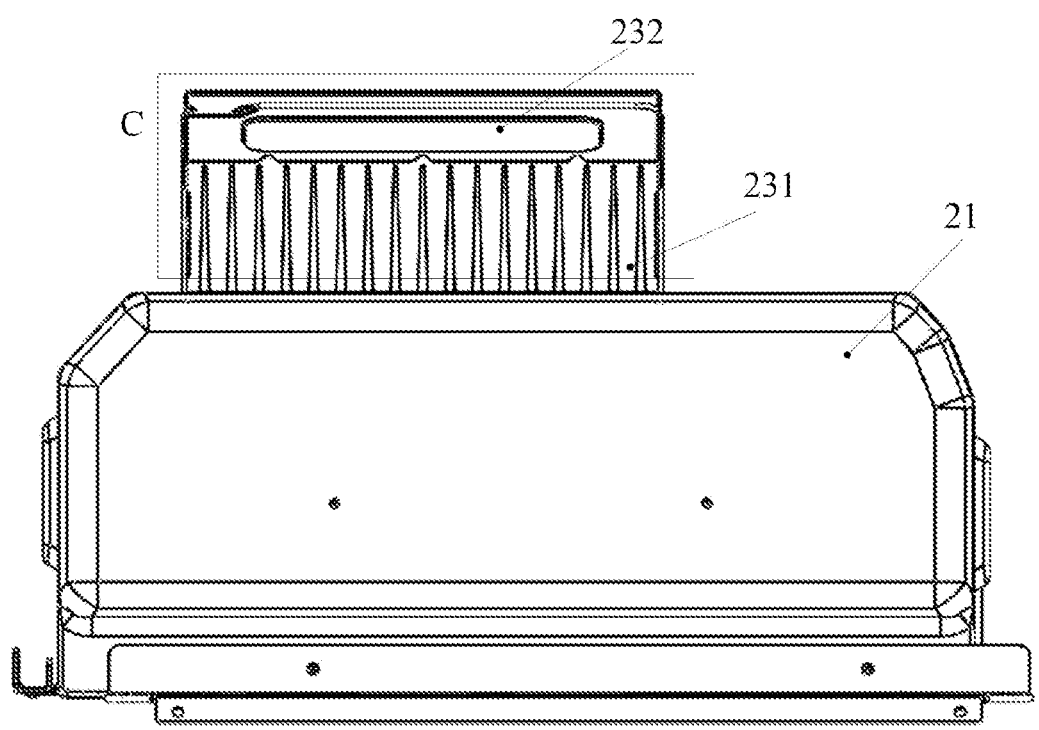
FIG. 7 is a fourth schematic structural view of an electrical control box of a multi-connected air conditioner according to an embodiment of the present disclosure.
Figure 8:
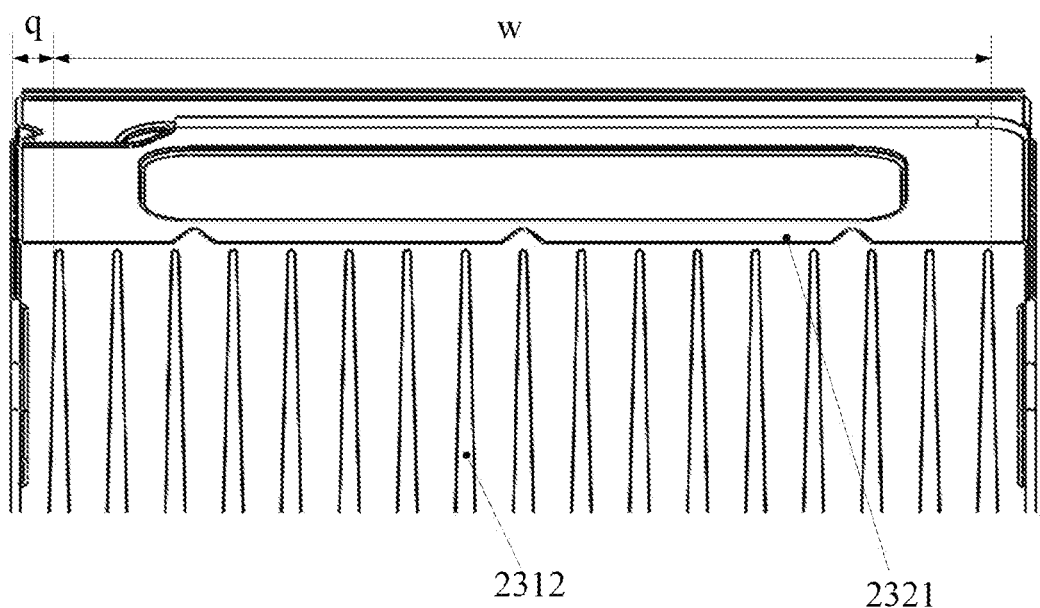
FIG. 8 is an enlarged schematic view of part C in FIG. 7.

Reference is made to FIG. 7 and FIG. 8, wherein FIG. 7 is a fourth schematic structural view of an electrical control box of a multi-connected air conditioner according to an embodiment of the present disclosure, and FIG. 8 is an enlarged schematic view of part C in FIG. 7. As shown in FIG. 7 and FIG. 8 and according to the orientation shown in FIG. 8, there is a first gap between the lowermost part of the base 2321 and the uppermost part of the heat sinks 2312, so that air flows between the plurality of heat sinks and through the first gap, and passes through the heat dissipation assembly, thereby taking away the heat of the heat sinks.

In order to ensure that the heat of the heat sinks 2312 can be better taken away when the air flows through the heat dissipation assembly, the first gap has a value ranging from 5-20 mm. It can be known that the first gap should not be too large or too small. If it is too large, there is a large, ineffective blank region between the flow guide member and the heat dissipation assembly. When the air flows through the heat dissipation assembly, part of the air passes through the first gap without flowing through the surfaces of the heat sinks, which reduces the heat dissipation efficiency; if the first gap is too small, the flow guide member and the heat dissipation assembly will interfere with each other, and when the air flows through the heat dissipation assembly, vibration noises and whistle sounds will arise, which will affect the noise index of the whole machine.

Furthermore, there are second gaps q between the two mounting pieces and the leftmost and rightmost heat sinks respectively so as to form sufficient passages between the mounting pieces and the heat sinks that allow air to flow therethrough. The width D of the flow guide member is related to the width w of the heat dissipation assembly. In order to ensure a better heat dissipation efficiency and avoid vibration noises, the width of the flow guide member may usually be calculated by using the following formula (1):

$$D = w + 2q \qquad (1)$$

In the formula (1), D is the width of the flow guide member, w is the width of the heat dissipation assembly, and q is the value of the second gap, wherein the value of the second gap q ranges from 3-5 mm. If the value of the second gap is too large, the outer dimension of the flow guide member will be too large, which will increase the cost of parts and molds, and will not be advantageous for the simplified design of the structure; and if the value of the second gap is too small, there may be resonance interference or whistle sounds.

It should be noted that the determination of the value of the first gap is related to the size of the heat dissipation assembly. Generally, the larger the size of the configured heat dissipation assembly is, the larger the value of the first gap will be. For example, when the width of the heat dissipation assembly is 20-100 mm, the value of the first gap will be 5 mm. For another example, when the width of the heat dissipation assembly is 200-300 mm, the value of the first gap will be 15 mm, and the size of the heat dissipation assembly is usually related to the power of the electronic control module. Those skilled in the art may select an appropriate size of the heat dissipation assembly and the value of the first gap according to the power of the specific electronic control module, so that the heat generated by the electronic control module can be taken away.

Figure 9:
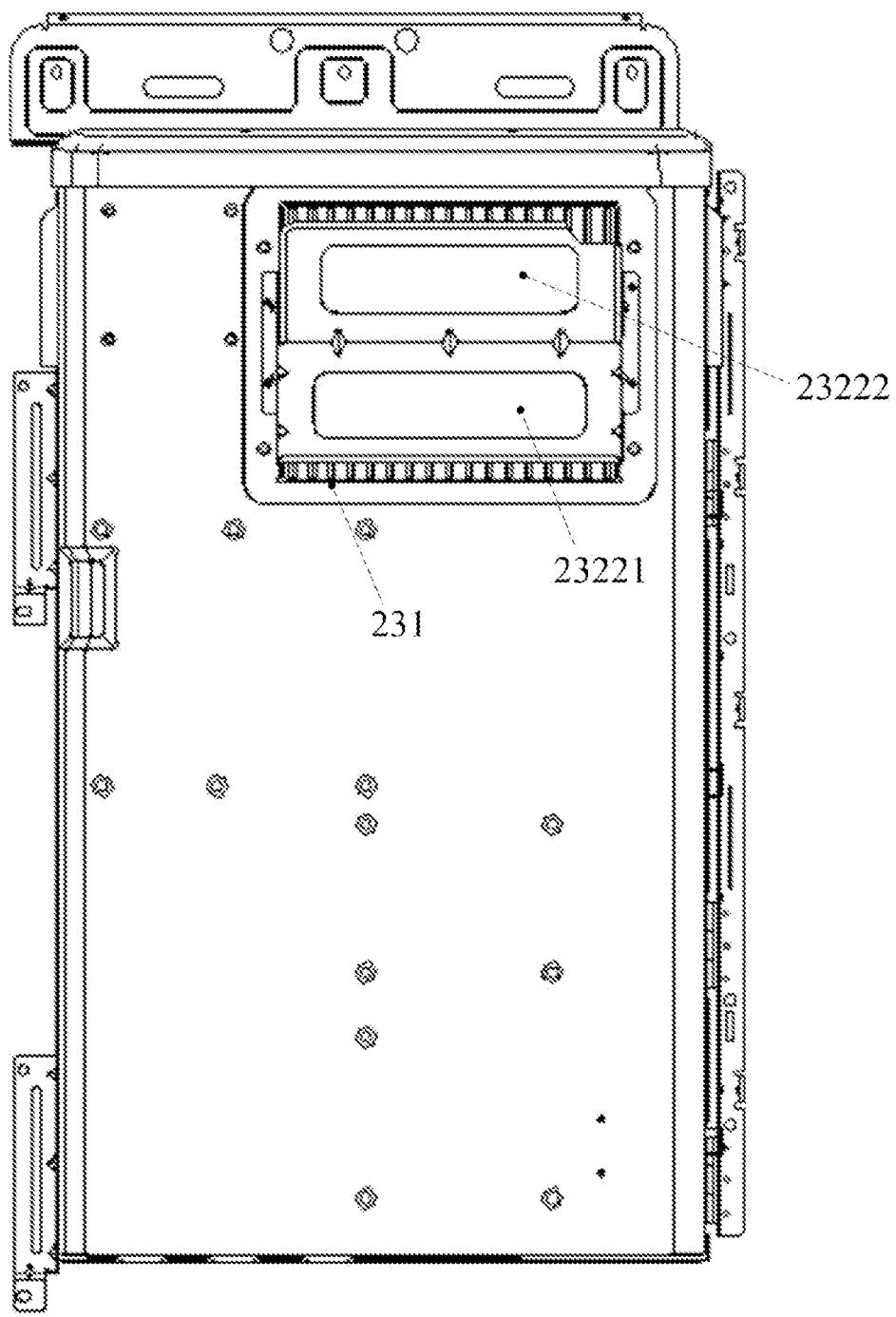
FIG. 9 is a fifth schematic structural view of an electrical control box of a multi-connected air conditioner according to an embodiment of the present disclosure.

Reference is made to FIG. 6 and FIG. 9, wherein FIG. 9 is a fifth schematic structural view of an electrical control box of a multi-connected air conditioner according to an embodiment of the present disclosure. As shown in FIG. 6 and FIG. 9 and according to the orientation shown in FIG. 9, the uppermost end of the second portion 23222 is lower than the uppermost end of the heat dissipation assembly 231, the lowermost end of the first portion 23221 is lower than the lowermost end of the heat dissipation assembly 231, and it is preferable that the size of the second portion 23222 in the vertical direction can just block the rainwater that is thrown to the upper part of the heat dissipation assembly under the centrifugal action of the fan so that the rainwater can be collected in the gathering region. In this way, not only the function of blocking rainwater from entering the heat dissipation assembly is realized, but also components are saved and simplified and the cost is saved. It can be understood that the uppermost end of the first portion may be flush with the uppermost end of the heat dissipation assembly or higher than the uppermost end of the heat dissipation assembly, and the lowermost end of the second portion may be flush with the lowermost end of the heat dissipation assembly or lower than the lowermost end of the heat dissipation assembly, with the purpose of blocking rainwater, achieving a suitable cost, and simplifying the design of components.

In order to better take away the heat generated by the electronic control module and prevent rainwater from entering the electronic control module through the heat dissipation assembly, the arrangement of the electronic control module of the present disclosure on the panel will be specifically described below with reference to the drawings.

Referring to FIG. 3 and FIG. 5, in order that the arrangement of various components can be more clearly observed, the portion inside circle B in FIG. 5 is enlarged and illustrated on the right side of FIG. 5. According to the orientation shown in FIG. 5, a silicone pad 24 is provided between the electrical control module 22 and the bottom plate 2311, that is, the electrical control module 22, the silicone pad 24 and the bottom plate 2311 are arranged in this order from left to right, and each of the electrical control module 22, the silicone pad 24 and the bottom plate 2311 is correspondingly formed with screw holes so that first screws 25 can fix them together.

Since the silicone pad has better thermal conductivity, and has certain tension and flexibility, an air gap between the electronic control module and the silicone pad and an air gap between the silicone pad and the heat dissipation assembly can be eliminated, thereby increasing an effective area of heat transfer between the electrical control module and the heat dissipation assembly so that the heat dissipation efficiency is further improved. In addition, the arrangement of the silicone pad can also play a certain sealing role, so that the rainwater on the heat dissipation assembly cannot directly enter the electrical control module, which also improves the waterproof performance of the electrical control box.

Figure 10:
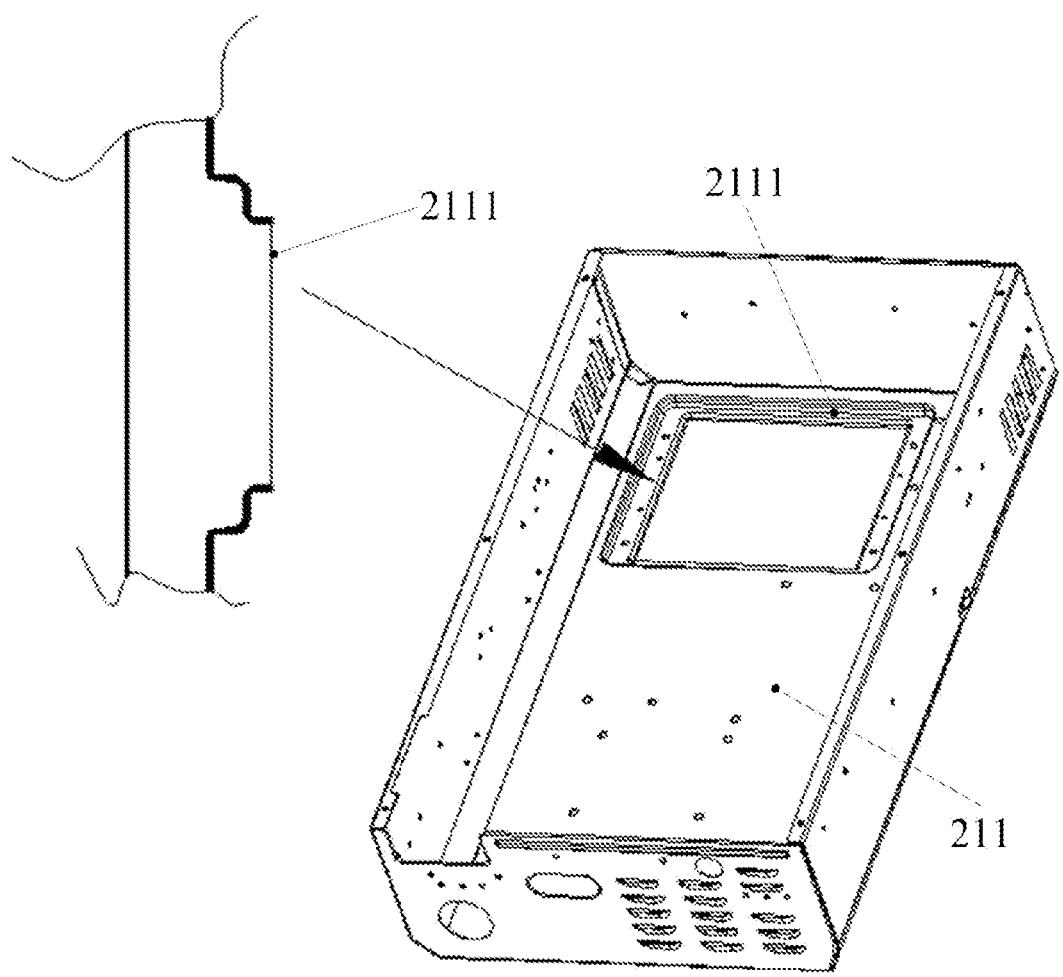
FIG. 10 is a first schematic structural view of a sinking platform on a panel of an electrical control box of a multi-connected air conditioner according to an embodiment of the present disclosure.
Figure 11:
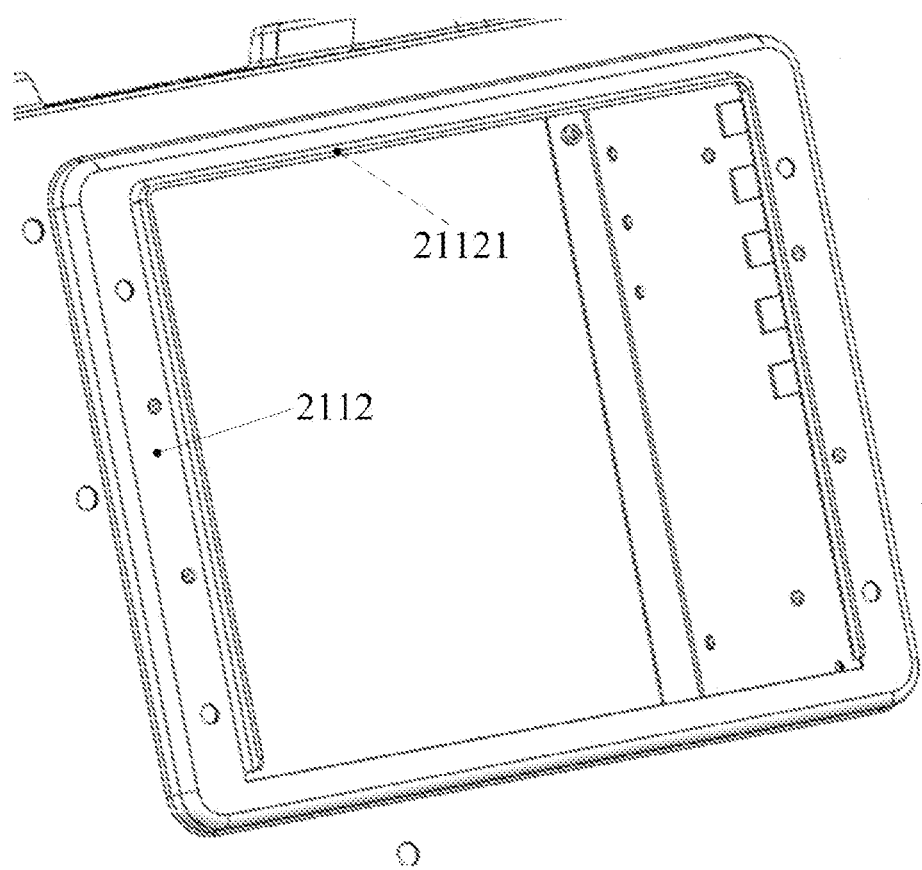
FIG. 11 is a second schematic structural view of a sinking platform on a panel of an electrical control box of a multi-connected air conditioner according to an embodiment of the present disclosure.

Reference is made to FIG. 5, FIG. 10, and FIG. 11, wherein FIG. 10 is a first schematic structural view of a sinking platform on a panel of an electrical control box of a multi-connected air conditioner according to an embodiment of the present disclosure, and FIG. 11 is a second schematic structural view of a sinking platform on a panel of an electrical control box of a multi-connected air conditioner according to an embodiment of the present disclosure. As shown in FIG. 5, FIG. 10 and FIG. 11 and according to the orientation shown in FIG. 5, the panel 211 is formed with a sinking platform 2111 at a position close to the electrical control module 22 (a schematic cross-sectional view of the sinking platform being illustrated on the left side of FIG. 10) Correspondingly, a boss 2112 is formed on the outer surface of the panel 211, and the electrical control module 22, the silicone pad 24 and the bottom plate 2311 are disposed in the sinking platform 2111 in sequence. In order to ensure an efficient heat dissipation efficiency of electronic control modules of different powers and in consideration of the cost, the depth of the sinking platform is usually set to be 1-1.3 times the thickness of the bottom plate. Preferably, the depth of the sinking platform is set to be 1.1 times the thickness of the bottom plate.

Furthermore, the boss 2112 has a folded edge 21121 extending rearwardly at a position close to the heat dissipation assembly. It can be seen that the folded edge 21121 is located above, leftward and rightward of the heat dissipation assembly 231, so that the rainwater falling from the top of the electrical control box can drop to a position of the heat dissipation assembly remote from the electrical control module, thereby reducing the possibility of the rainwater entering the electrical control module, and therefore improving the waterproof performance of the electrical control box. Preferably, the height of the folded edge 21121 is 5-10 mm.

In summary, in the preferred technical solution of the present disclosure, the electrical control module is configured with the heat dissipation assembly capable of taking away the heat generated by the electrical control module, and the flow guide member encloses the heat dissipation assembly; the flow guide member includes the first portion and the second portion each provided in a sheet-like structure, wherein the included angle between the first portion and the panel is larger than the included angle between the second portion and the panel; in this way, the first portion and the heat dissipation assembly form the air intake region with a larger area, and the second portion and the heat dissipation assembly form the air discharge region with a smaller area, so that the velocity of the air flowing through the heat dissipation assembly is increased. In addition, the first portion and the second portion form the gathering region on the rear side of the electrical control box, so as to prevent liquid entering the outdoor unit of the air conditioner from the air outlet from entering the electrical control module through the heat dissipation assembly, thereby improving the waterproof performance of the electrical control box.

Heretofore, the technical solutions of the present disclosure have been described in connection with the preferred embodiments shown in the drawings, but it can be easily understood by those skilled in the art that the scope of protection of the present disclosure is obviously not limited to these specific embodiments. Those skilled in the art can make equivalent changes or replacements to related technical features without departing from the principle of the present disclosure. The technical solutions obtained after the modification or replacement will fall within the scope of protection of the present disclosure.

What is claimed is:

1. An air conditioner, comprising:
    an outdoor unit of the air conditioner, the outdoor unit of the air conditioner having an air outlet and comprising an electrical control box, and the electrical control box comprising an electrical control module configured with a heat dissipation unit;
    the heat dissipation unit comprises a heat dissipation assembly and a flow guide member enclosing the heat dissipation assembly, the flow guide member and the heat dissipation assembly form an air discharge region at a position adjacent to the air outlet, and the flow guide member and the heat dissipation assembly form an air intake region at a position away from the air outlet, so that at least a part of air flowing through the heat dissipation assembly passes through the air intake region, the air discharge region and the air outlet in sequence before being discharged from the outdoor unit of the air conditioner; and
    the area of the air discharge region is smaller than the area of the air intake region
    wherein the flow guide member comprises a flow guide portion, and the flow guide portion forms a gathering region on a surface away from the electrical control module so as to block liquid from entering the electrical control module through the heat dissipation assembly;
    wherein the flow guide portion comprises a first portion and a second portion; and
    the first portion and the heat dissipation assembly form the air intake region, the second portion and the heat dissipation assembly form the air discharge region, and the first portion and the second portion form the gathering region on the surface away from the electrical control module.

2. The air conditioner according to claim 1, wherein the electrical control box comprises a panel on which the electrical control module is disposed; and
    wherein the first portion and the second portion are both of a sheet-like structure, and an included angle between the first portion and the panel is larger than an included angle between the second portion and the panel.

3. The air conditioner according to claim 2, wherein the included angle between the first portion and the panel is between 55° and 70°.

4. The air conditioner according to claim 2, wherein the included angle between the second portion and the panel is between 50° and 65°, and/or
    the included angle between the first portion and the panel is 3° to 8° larger than the included angle between the second portion and the panel.

5. The air conditioner according to claim 1, wherein the gathering region has a first gap with the heat dissipation assembly at a position closest to the heat dissipation assembly; and
    the range of the first gap is 5-20 mm.

6. The air conditioner according to claim 2, wherein the flow guide member comprises a base, the first portion and the second portion are disposed on the base through integral molding or fixed connection, and the base is connected to the panel.

7. The air conditioner according to claim 6, wherein the base is of a plate-like structure, and there is a second gap between the base and the heat dissipation assembly on a corresponding side; and
    the range of the second gap is 3-5 mm.

8. The air conditioner according to claim 1, wherein there is a distance difference between a distance from an outer edge of the first portion in an air-discharging direction to an outer edge of the heat dissipation assembly in the air-discharging direction, and a distance from an outer edge of the second portion in the air-discharging direction to the outer edge of the heat dissipation assembly in the air-discharging direction.

* * * * *